(12) United States Patent
Burnsed et al.

(10) Patent No.: US 11,988,819 B2
(45) Date of Patent: May 21, 2024

(54) REDUCED THICKNESS NIGHT VISION DEVICE

(71) Applicant: L3Harris Technologies, Inc., Melbourne, FL (US)

(72) Inventors: Jon D. Burnsed, Tempe, AZ (US); Joseph C. Ottney, Newmarket, NH (US); Nicholas W. LeCain, Pembroke, NH (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 215 days.

(21) Appl. No.: 17/352,024

(22) Filed: Jun. 18, 2021

(65) Prior Publication Data

US 2022/0404594 A1 Dec. 22, 2022

(51) Int. Cl.
*G02B 13/16* (2006.01)
*G02B 6/04* (2006.01)

(52) U.S. Cl.
CPC ............... *G02B 13/16* (2013.01); *G02B 6/04* (2013.01)

(58) Field of Classification Search
CPC ........ G02B 13/16; G02B 6/04; G02B 3/0056; G02B 27/0172; G02B 23/12
See application file for complete search history.

(56) References Cited

U.S. PATENT DOCUMENTS

| | | | |
|---|---|---|---|
| 4,641,931 A | 2/1987 | Loy | |
| 4,923,276 A | 5/1990 | Wells | |
| 5,229,598 A | 7/1993 | Filipovich | |
| 5,852,291 A * | 12/1998 | Thomas | G02B 23/125 250/214 VT |
| 6,075,644 A | 6/2000 | Filipovich | |
| 6,088,165 A | 7/2000 | Janeczko et al. | |
| 6,201,641 B1 | 3/2001 | Filipovich | |
| 6,469,828 B2 | 10/2002 | Plotsker | |
| 6,847,027 B2 | 1/2005 | Iosue | |
| 8,269,159 B2 | 9/2012 | Filipovich et al. | |
| 2004/0021938 A1 | 2/2004 | Filipovich et al. | |
| 2006/0103924 A1 | 5/2006 | Katz | |
| 2007/0247715 A1 | 10/2007 | Francis | |
| 2013/0286475 A1 | 10/2013 | Greener | |
| 2020/0114069 A1 | 4/2020 | Searle et al. | |

FOREIGN PATENT DOCUMENTS

FR 2563016 A1 10/1985

OTHER PUBLICATIONS

European Search Report received for EP Patent Application No. 22175224.9, dated Oct. 25, 2022, 8 pages.

* cited by examiner

*Primary Examiner* — John Bedtelyon
(74) *Attorney, Agent, or Firm* — Workman Nydegger

(57) ABSTRACT

An optical device. The optical device includes a zonal objective array comprising an array of objectives. The optical device further includes a zonal fiber-optic inversion bundle. The zonal fiber-optic inversion bundle includes a plurality of sub-bundles, each sub-bundle having an input coupled to a corresponding objective in the zonal objective array. The optical device further includes a zonal eyepiece array comprising an array of eyepieces. Each of the eyepieces in the zonal eyepiece array is coupled to an output of a corresponding sub-bundle in the zonal fiber-optic inversion bundle.

20 Claims, 8 Drawing Sheets

REDUCED THICKNESS NIGHT VISION DEVICE

BACKGROUND

Background and Relevant Art

Night vision systems allow a user to see in low-light environments without external human visible illumination. This allows for covert vision in a low-light environment to prevent flooding the environment with human visible light and/or protects the user from being detected due to causing human visible light or light that is otherwise detectable to other night vision systems to be emitted.

Some night vision systems function by receiving low levels of light reflected off of, or emitted from objects and providing that light to an image intensifier (sometimes referred to as $I^2$). The image intensifier has a photocathode. When photons strike the photocathode, electrons are emitted through a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can view the illuminated phosphor screen, thus allowing the user to see the objects.

These types of systems are relatively heavy when considering that they may be head worn for extended periods of time. For example, the majority of such systems weigh around two pounds. Further, these systems typically include a significant amount of weight protruding some distance in front of the user's head and particularly in front of the user's face. This creates a significant moment arm about the user's neck causing torque on the neck and resulting in neck strain.

Thus, it would be useful if nightvision and other head worn systems could be implemented to reduce weight and neck strain. It would also be useful if such systems were able to maintain or improve upon field-of-view as compared to existing systems. Alternatively, or additionally, it would also be useful if such systems were able to maintain or improve upon spectral bandwidths of existing systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an optical device. The optical device includes a zonal objective array comprising an array of objectives. The optical device further includes a zonal fiber-optic inversion bundle. The zonal fiber-optic inversion bundle includes a plurality of sub-bundles, each sub-bundle having an input coupled to a corresponding objective in the zonal objective array. The optical device further includes a zonal eyepiece array comprising an array of eyepieces. Each of the eyepieces in the zonal eyepiece array is coupled to an output of a corresponding sub-bundle in the zonal fiber-optic inversion bundle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
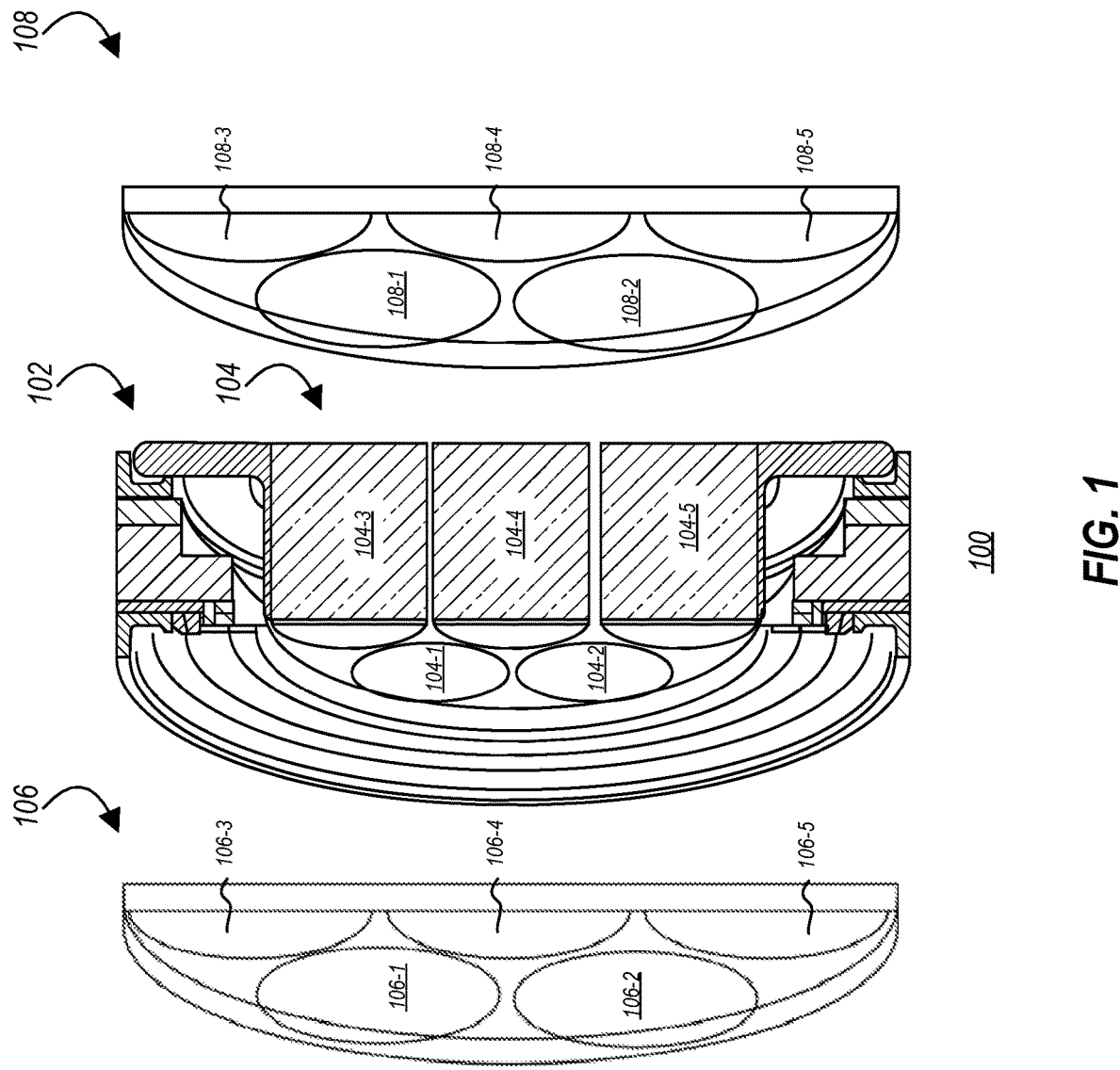
FIG. 1 illustrates a cut-away view of an optical device.

Embodiments illustrated herein are directed to weight reduction and lowering torque about a user's neck to reduce neck strain for head worn optical devices. This is accomplished by reducing the thickness of the optical devices with respect to protrusions protruding from a user's face. Further, embodiments illustrated herein are able to improve or maintain the field-of-view as compared to existing systems. Further, embodiments are, alternatively or additionally able to improve or maintain spectral bandwidths as compared to existing systems.

In some embodiments, this is accomplished by using a new and novel device referred to herein as a fiber-optic zonal inversion bundle. In particular, direct view systems typically require some type of inversion. In particular, due to the nature of light travel, without inversion, images produced by direct view systems would be upside down and backwards. Thus, direct view systems use optical inversion to correct the images prior to outputting them at an eyepiece for the user. This can be done in several fashions. For example, historically, this has been done using lenses or group of prisms, either of which add substantial length and weight. In more recent times, this has been accomplished using fiber-optic inverters. A fiber-optic inverter is manufactured by heating a bundle of fiber-optic fibers in the middle of the bundle and then simply twisting the ends of the bundle 180° from each other. This essentially inverts an image at the input of the fiber-optic inverter with respect to the output of the fiber-optic inverter.

However, the larger the diameter of the bundle is, the longer the bundle must be to effectively create the fiber-optic inverter without excessive distortion in the image, especially at the edge of the inversion. Further, as it is desirable to have a large field-of-view in certain optical systems, such as nightvision systems, this means that the fiber-optic bundle is both relatively large in diameter and thus long in length. This length contributes to the previously described problem of creating a long moment arm protruding from a user's face.

Embodiments illustrated herein are able to maintain (or in some embodiments, even improve) the field-of-view of previous systems while reducing the length of a fiber-optic inverter by creating what is referred to herein as a fiber-optic zonal inversion bundle. The fiber-optic zonal inversion bundle is constructed of a plurality of sub-bundles. Each of these sub-bundles is implemented for a particular portion of the field-of-view. Thus, for example, for a series of 3 sub-bundles each having a field-of-view of 30°, the combination could maintain a field-of-view of 90°, at least in one direction. The sub-bundles are smaller than bundles in previously implemented fiber-optic inverters thus allowing them to also be shorter in length, thus reducing the moment arm extending from a user's face.

Additional elements may also be implemented to achieve lower weight and reduced moment arm in optical devices. For example, in some embodiments, a planar objective array having an array of objectives using multi-level diffractive lenses (MDL) or other planar optical technology may be used to implement a relatively thin objective for inputting light into the fiber-optic zonal inversion bundle. Similarly, at the output of the fiber-optic zonal inversion bundle, a planar zonal eyepiece array may be implemented such that an array of eyepiece elements can be implemented using MDL or other planar optical technology further reducing the moment arm about a user's face.

Alternatively or additionally, in some embodiments specialized thin image intensifier tubes may be used between an objective element and the fiber-optic zonal inversion bundle. For example, an intensifier tube based on multilayer ceramic body technology may be used to further reduce thickness of optical devices as compared to previously implemented optical devices, to further reduce the moment arm about a user's face. Specific details are now illustrated.

Referring now to FIG. 1, portions of an optical device 100 are illustrated. In this example, a cross sectional view of an optical device 100 is shown. Note that not shown are enclosures or other elements configured to maintain appropriate distances between the various elements. This is done to show the arrangement of the internal components of the device 100. In particular, a finite amount of space is required between the objective array 106 and image intensifier 102, and the eyepiece and fiber-optic zonal inversion bundle 104. Nominal spacing is shown in FIG. 1, but could be smaller or larger dependent upon design parameters.

Figure 2:
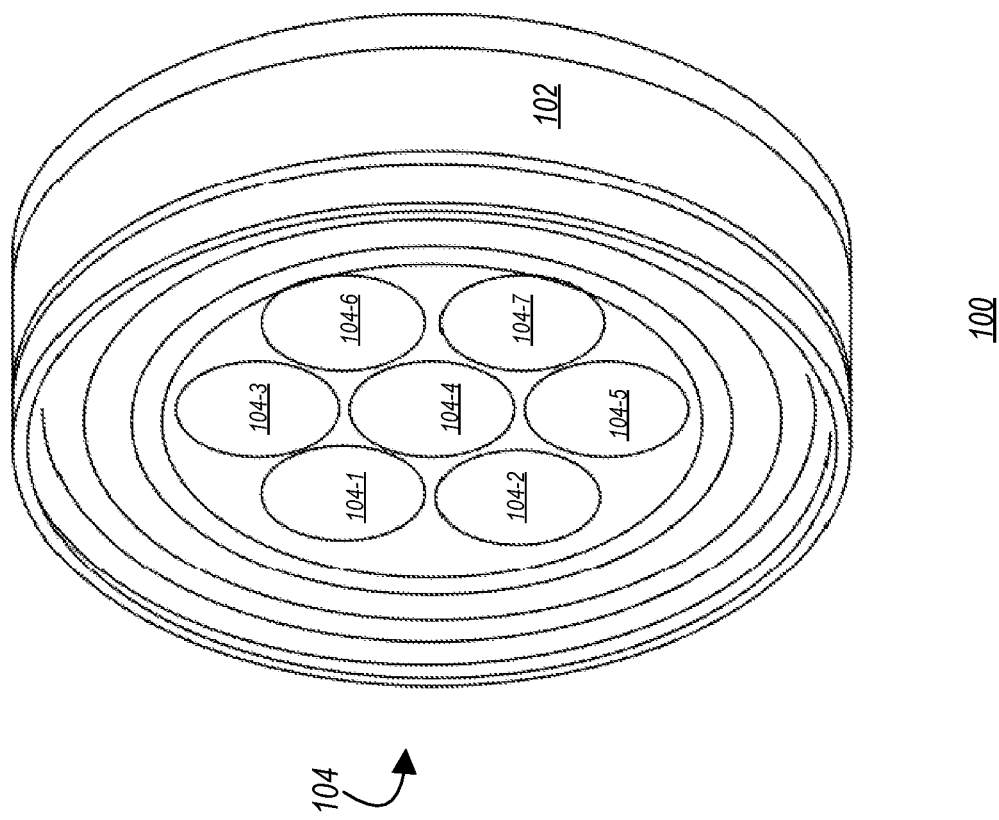
FIG. 2 illustrates an isometric view of only the image intensifier and a fiber-optic zonal inversion bundle of the optical device.
Figure 3:
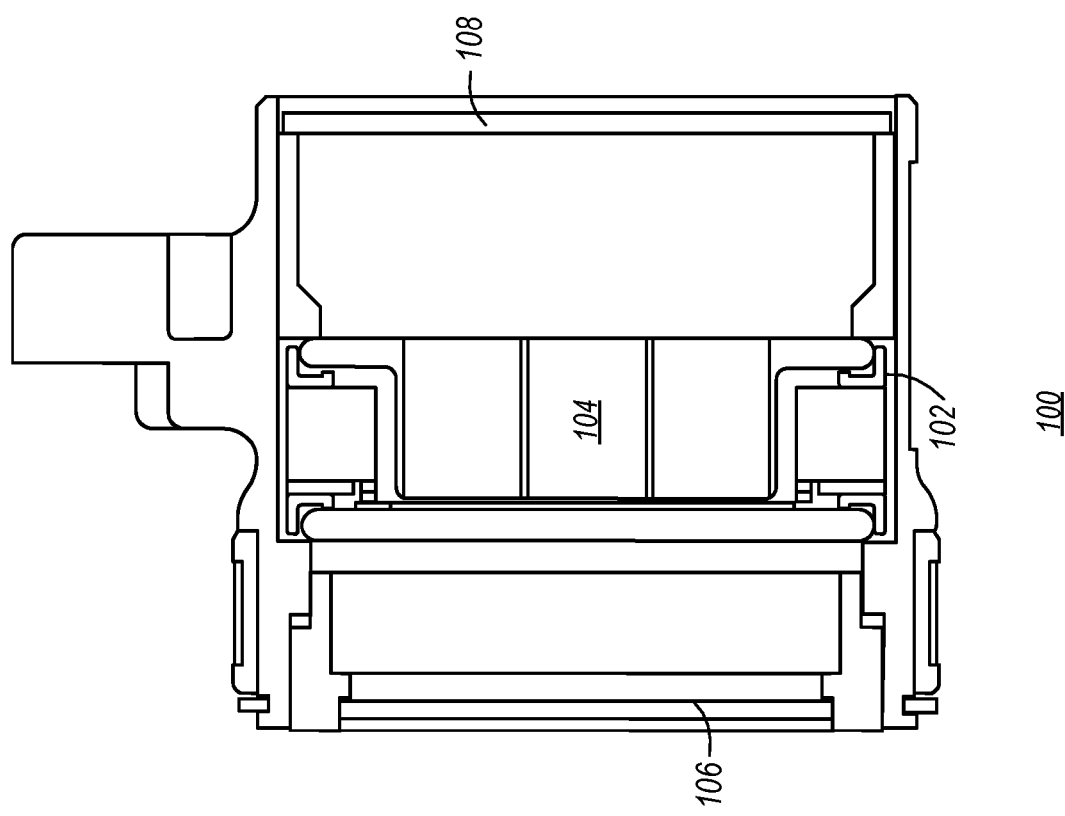
FIG. 3 illustrates a cross sectional view, including appropriate enclosures, of the optical device.
Figure 4:
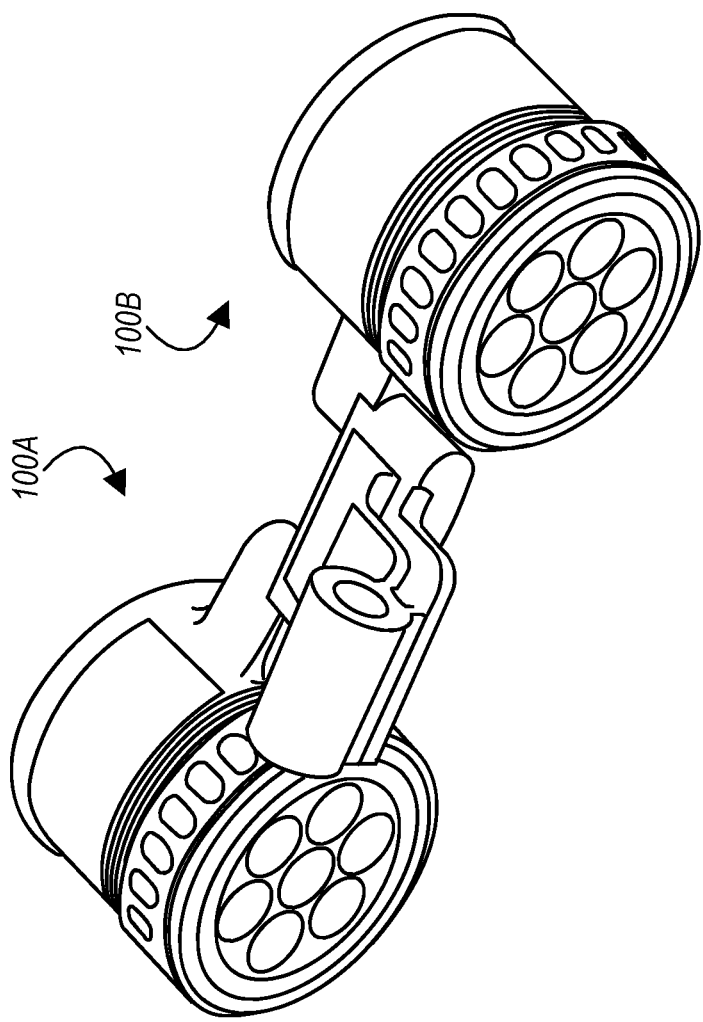
FIG. 4 illustrates an isometric view of two optical devices implemented in a binocular system.

An example device 100 is illustrated in FIG. 3 which shows a cross sectional view including appropriate enclosures. FIG. 4 illustrates an isometric view of two optical devices 100A and 100B implemented in a binocular system. See FIG. 2 for an isometric view of only the image intensifier 102 and a fiber-optic zonal inversion bundle 104 discussed in more detail below.

The optical device 100 is a portion of a nightvision system based on image intensifier technology. In particular, FIG. 1 illustrates that the optical device 100 includes an image intensifier 102. The image intensifier 102 may be implemented in any one of a number of different fashions. For example, the image intensifier may be implemented using the fairly common approximately 1.3"×0.6" standard technology. However, in some embodiments, the image intensifier may be implemented using multilayer ceramic body technology. Image intensifiers based on this technology may be implemented with a reduced thickness. For example, image intensifiers of approximately 0.36 inches thick have been implemented using multilayer ceramic body technology. Thus, image intensifiers of approximately 1.035"×0.36" can be implemented using multilayer ceramic body technology. Indeed, embodiments may include customized designs of, for example, 2" (or greater)×0.36" dimensioned image intensifiers for improved field of view and/or resolution while nonetheless having reduced thickness, and thus a reduced moment arm as compared to existing devices.

Referring once again to FIG. 1, a fiber-optic zonal inversion bundle 104 is illustrated. In this particular example, due to the cutaway nature of the illustration, all or portions of 5 sub-bundles 104-1 through 104-5 are illustrated. Each of these sub-bundles is constructed by heating a bundle of fibers in the middle of the bundle of fibers and twisting the ends of the bundle 180° with respect to each other. These sub-bundles are then combined into the overall fiber-optic zonal inversion bundle 104. Thus, the fiber-optic zonal inversion bundle 104 includes zones defined by the sub-bundles.

The sub-bundles may be formed into a fiber-optic zonal inversion bundle by embedding the sub-bundles together in a glass substrate. That is, space between sub-bundles in a fiber-optic zonal inversion bundle may be glass filled to physically and securely couple the sub-bundles together and darkened to only allow for imaging through the sub-bundles and eliminate stray light artifacts. In alternative embodiments, the space between sub-bundles may be filled with other materials, such as ceramic, epoxy, or other appropriate materials.

The optical device 100 further includes a zonal objective array 106. The zonal objective array 106 directs light to the image intensifier 102. As illustrated in the example of FIG. 1, the zonal objective array 106 includes all or part of 5 objectives 106-1 through 106-5. The objectives in the zonal objective array 106 correspond to the sub-bundles in the fiber-optic zonal inversion bundle 104. That is, the zonal objective array 106 includes an objective for each of, and corresponding, to the sub-bundles in the fiber-optic zonal inversion bundle 104. This allows light to be provided to the image intensifier 102 which then intensifies images as described previously and outputs light into the different sub-bundles of the fiber-optic zonal inversion bundle 104. Thus, each objective in the zonal objective array 106 is optically coupled, through the image intensifier 102, to a sub-bundle in the fiber-optic zonal inversion bundle 104.

FIG. 1 further illustrates a zonal eyepiece array 108. In the illustrated example, and due to the cutaway nature of the example, the zonal eyepiece array 108 includes 5 eyepieces 108-1 through 108-5. The zonal eyepiece array 108 includes an eyepiece corresponding to each of the sub-bundles in the fiber-optic zonal inversion bundle 104. Thus, intensified light from the output of the sub-bundles in the fiber-optic zonal inversion bundle 104 are transmitted to the eyepieces in the zonal eyepiece array 108 where the intensified light can be provided to a user. Attention is now directed to FIG.

2 which illustrates an isometric view of only the image intensifier 102 and a fiber-optic zonal inversion bundle 104 of the optical device 100. In this example, all seven sub-bundles 104-1 through 104-7 are shown. While not shown, the optical device 100 further includes a zonal objective array having seven corresponding objectives and a zonal eyepiece array having seven corresponding eyepieces.

Figure 5:
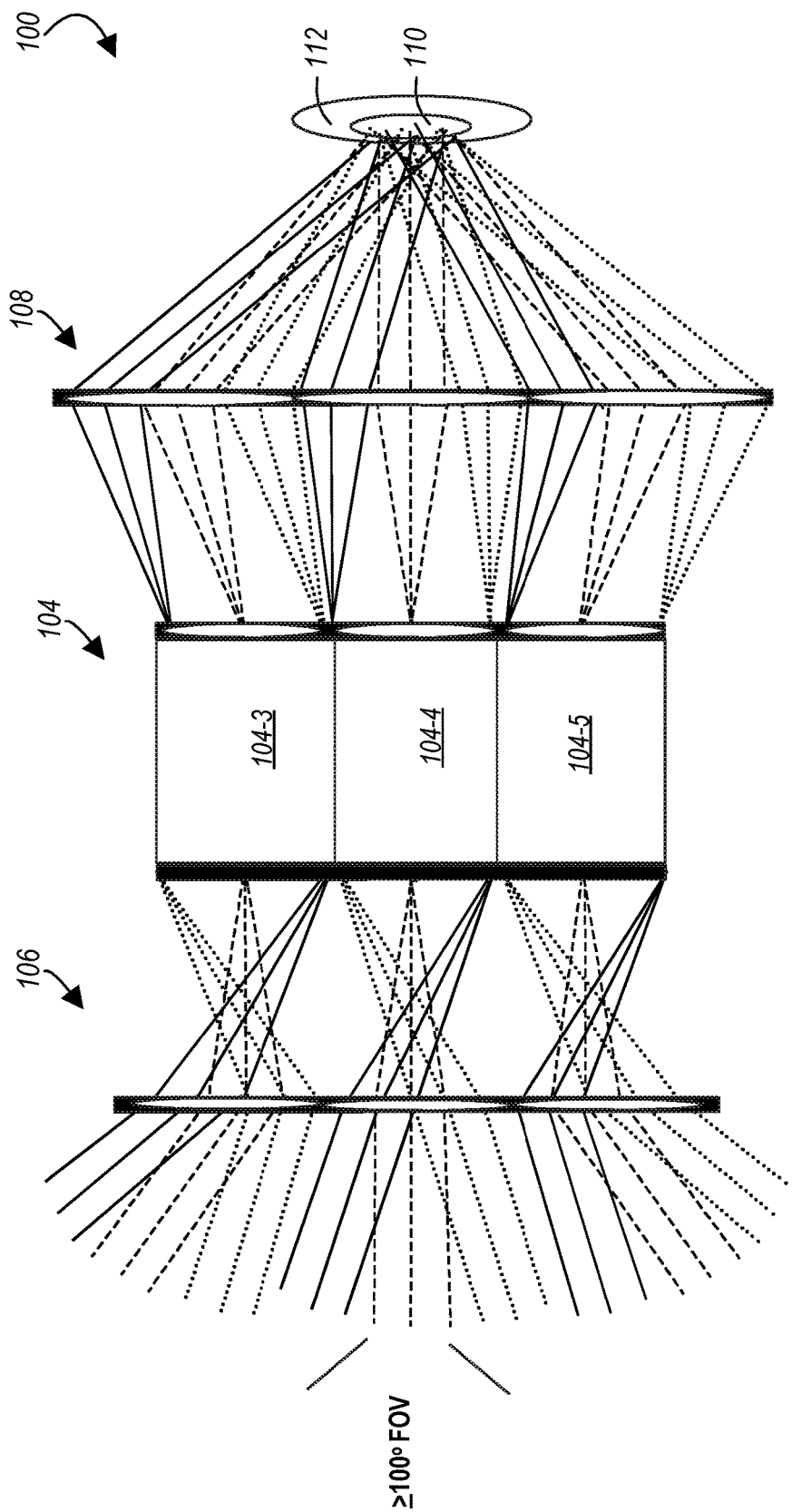
FIG. 5 illustrates a ray trace diagram for an improved optical device.

Referring now to FIG. 5, an example of the optical device 100 is illustrated in conjunction with ray traces showing the functionality of the fiber-optic zonal inversion bundle 104 in the context of the optical device 100. In this example, the optical device 100 has a field-of-view of 100°. This is accomplished by different zones of the optical device 100 being responsible for approximately 34° of field-of-view. In this example, a simplified example showing only the zones located on vertical center of the various component arrays. For example, FIG. 5 illustrates the zonal objective array 106 having objectives 106-3, 106-4, and 106-5 (see FIG. 1). Those objectives direct light into the image intensifier 102 (see FIG. 1) which outputs intensified light into sub-bundles 104-3, 104-4, and 104-5 of the fiber-optic zonal inversion bundle 104. The sub-bundles invert the light received from the image intensifier 102 and output the inverted light to the zonal eyepiece array 108 and in particular to corresponding eyepieces in the eyepiece 108-3, 108-4, and 108-5. The light is then refracted into the pupil 110 of the eye 112 of the user. Thus, in summary, each sub-bundle in the fiber-optic zonal inversion bundle 104 has an objective from the zonal objective array 106 which is optically coupled to receive light through a corresponding portion of the image intensifier 102. Further, each sub-bundle in the fiber-optic zonal inversion bundle 104 has a corresponding eyepiece in the zonal eyepiece array 108 to which it provides light at the output of the sub-bundle.

Zone Alternatives

While zones in the preceding figures have been illustrated as being circular, it should be appreciated that in other embodiments squares, hexagons, octagons, or other shapes can be implemented. Indeed, depending on the configuration, shapes may be selected to minimize material between zone elements. For example, elements have six zones may be implemented using at least a pentagon shaped zone in the middle zone with other zones also being pentagons, or having at least one flat size appropriately dimensioned to interface with the sides of the middle pentagon zone. Alternatively, in the examples illustrated herein, the seven zone examples illustrated may be implemented using hexagonal shapes, at least with respect to the middle zones, allowing for a six sided shape in the center and six appropriately shaped elements around the middle element.

Image Intensifier Alternatives

Various different alternatives can be implemented for the image intensifier. For example, as discussed above, embodiments may implement a multilayer ceramic design for the body of the image intensifier which allows for thinner image intensifiers.

In some embodiments, the image intensifier may include zones similar to those illustrated above for other components. Those zones may be implemented in one or more different fashions. For example, in some embodiments, different image intensifier tubes may be used for different zones.

Alternatively, a single tube may be used, but one or more of the components in the image intensifier tube may be zonal in nature. An image intensifier may include a fiber-optic faceplate which provides photons to a photocathode. When photons strike the photocathode, electrons are emitted through a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, such as the zonal fiber-optic bundle illustrated previously. Thus, embodiments may be implemented where one or more of the fiber-optic faceplate, photocathode, vacuum tube, microchannel plate, and/or phosphor screen are zonal in nature. In some embodiments, the zones of these elements may be optimized in size and arrangement based on thickness reducing elements, such as the fiber-optic zonal inversion bundle. Thus, for example, if individual inverters in the fiber-optic zonal inversion bundle function together better with fiber-optic faceplates of a certain size, photocathodes of a certain size, vacuum tubes of a certain size, microchannel plates of a certain size and/or phosphor screens of a certain size, then those elements can be so sized and constructed using a zonal construction made up of multiple elements, each in their own zone.

Alternatively or additionally, in some embodiments the image intensifier may actually be constructed of a plurality of intensifier tubes, one tube for each zone. In this case, the intensifier tubes may have a smaller diameter, corresponding to sizes for zonal objectives, zonal inversion bundles, and/or zonal eyepieces, than current conventional intensifier tubes.

Optic Alternatives

Various alternatives may be implemented for the optics including the zonal objective array and/or the zonal eyepiece array. As noted above, in some embodiments, the optics may be implemented as planar optics. For example, in some such embodiments, the optics may have approximately a 10 mm effective focal length. Planar optics are typically manufactured by having a thin sheet of glass or polymer etched with diffractive optical elements in single or multiple layers.

Figure 6:
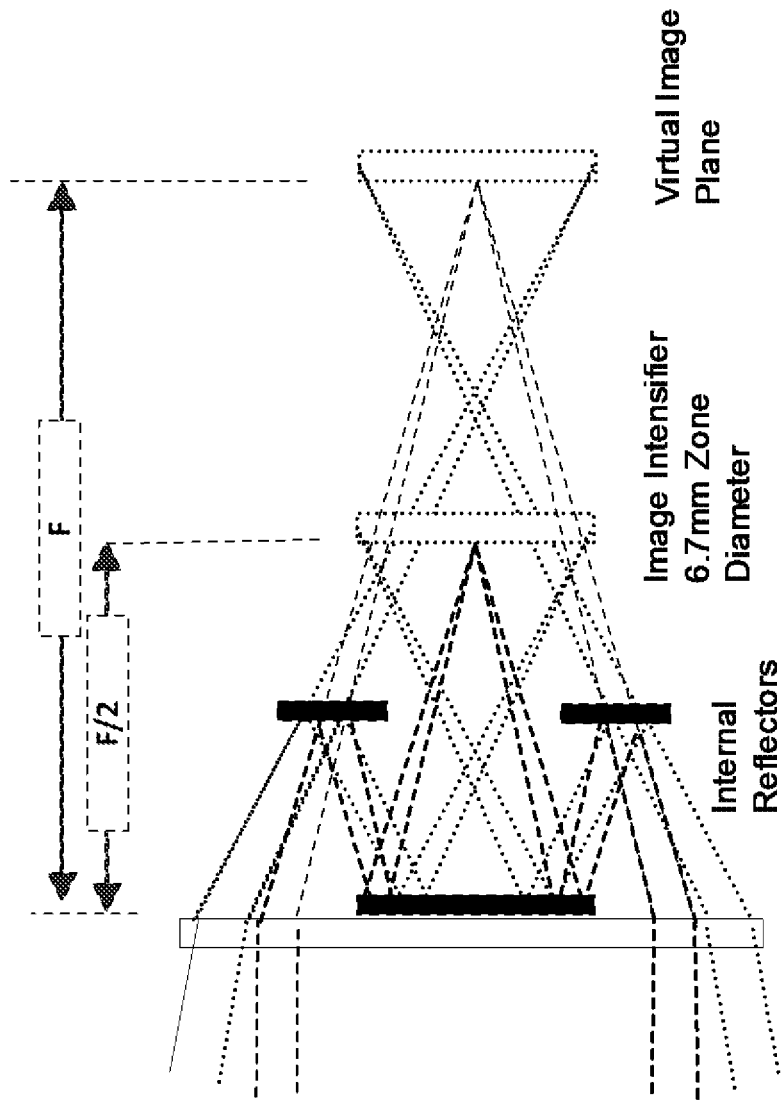
FIG. 6 illustrates a portion of an optical device implementing a catadioptric folded refracting objective.
Figure 6:
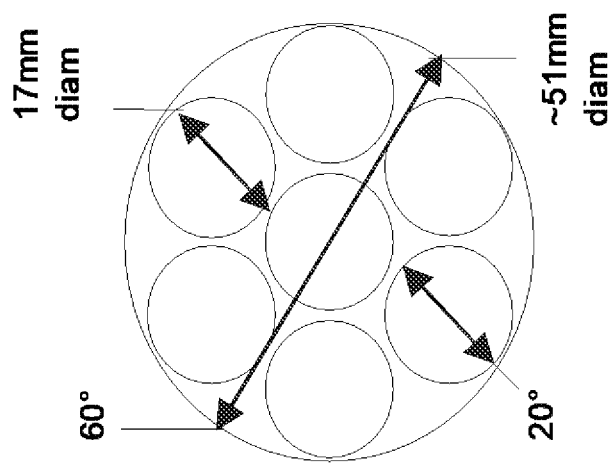
Figure 7:
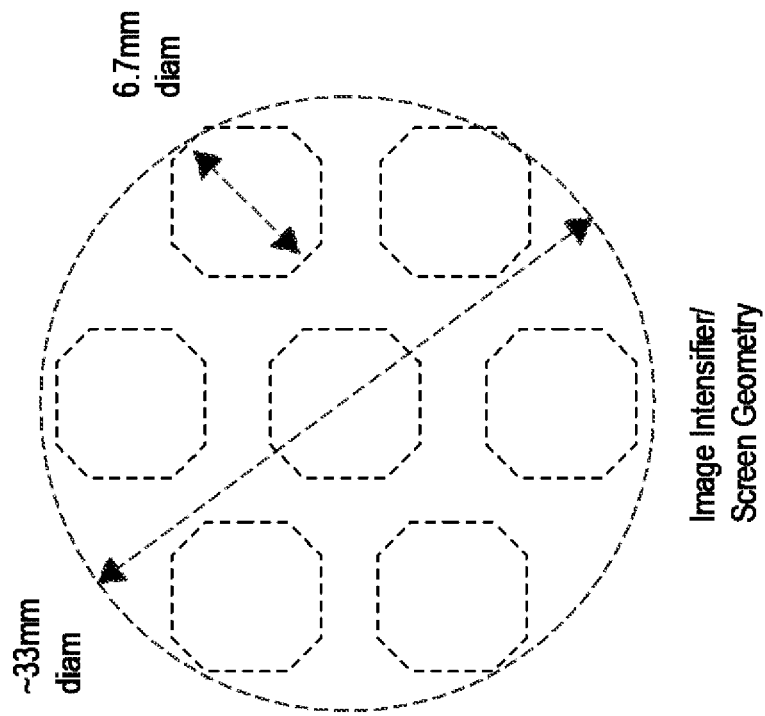
FIG. 7 illustrates a portion of an optical device implementing a catadioptric folded refracting objective.
Figure 7:
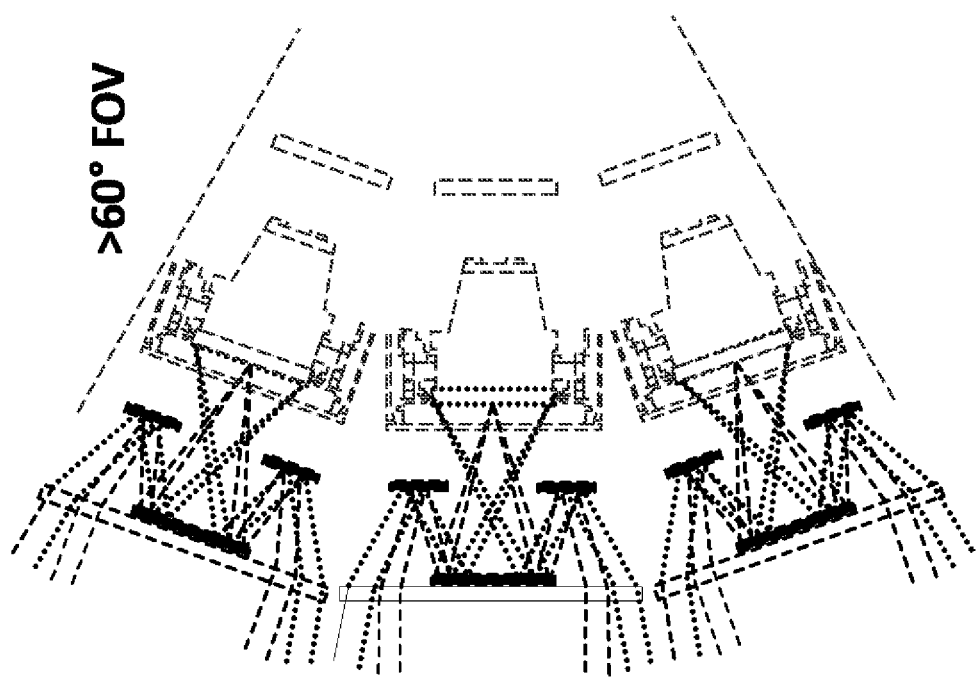

Alternatively, optics incorporating internal reflective layers may be implemented. An example of this is illustrated with reference to FIG. 6. In particular, FIG. 6 illustrates a catadioptric folded objective, incorporating refractive and reflective elements, where several such objectives can be included in a zonal objective array. Such embodiments allow for a smaller field of view per zone to trade off resolution for active area. For example, FIG. 7 illustrates how using such objectives in a zonal objective array can be done to implement individual objectives having a 20° field-of-view into a zonal objective array having a 60° field-of-view. While this smaller field-of-view requires a longer focal length, the folded optical design keeps the system moment arm shorter to avoid increasing torque on the user's neck. It also enables the sensor resolution to be spread across a smaller field-of-view for improved angular resolution which would be otherwise impractical or impossible.

Alternatively or additionally, planar meta lenses or meta surfaces may be implemented and used in place of diffractive or multi-layer diffractive lenses (MDL). A characteristic difference between meta lenses and MDL being size of features embedded within the planar element.

Alternatively or additionally, conventional, discrete optical lens assemblies, with carefully arranged elements, may be implemented.

Alternatively or additionally, hybrid lenses can be implemented, wherein a combination MDL, meta lenses or meta surfaces, and/or conventional discrete lenses may be utilized.

Size Alternatives

Various size and field-of-view alternatives may be implemented. For example, in one embodiment, the zonal objective array comprises seven circular objectives each being 8 mm in diameter with a total zonal objective array diameter of 24 mm. Further, each objective has a 34° angle field-of-view giving approximately a 100° field-of-view for the entire zonal objective array. In an alternative embodiment, 7 circular objectives may be implemented, each objective being 6.7 mm in diameter, making a zonal objective array of approximately 33 mm in diameter. In this example, each objective supports a 20° field of view, such that the zonal objective array supports a 60° field of view.

Using larger size components generally allows for increased field of view, resolution, or ability to capture light from dim sources.

With respect to the sub-bundles of the zonal fiber-optic inversion bundle, in some embodiments, outputs of the sub-bundles are selected such that the outputs are between 2 to 8 mm wide. This represents a broad range of human eye pupil sizes. Alternatively, in some embodiments, the sub-bundles are selected such that the outputs are between 4 to 6 mm wide. This represents a large majority of human eye pupil sizes and thus is a more preferred size as it will more closely match more human pupil sizes than other sub-bundle sizes that are outside of this range.

Zonal Inversion Alternatives

While the examples illustrated above have been shown using fiber-optic zonal inversion bundles, it should be appreciated that other zonal inversion alternative may be implemented. For example, in some embodiments, conventional lenses or other optics may be implemented in a zonal arrangement and used as a zonal optical inverter. Alternatively, hybrid zonal inversion devices may be implemented where portions of the zonal inverter are constructed of fiber-optic inverters and portions are constructed using lenses or other elements. For example, zones that would benefit from higher resolution (e.g., for central vision) may use conventional lenses, while zones that have less benefit from higher resolution (e.g., for peripheral vision) may opt for fiber-optic inversion.

Direct View Source Alternatives

While the examples illustrated above have been shown using image intensifiers, it should be appreciated that other direct view image sources may be used. For example, embodiments may use various wavelength sensors, such as heat sensors or other sensors.

Combination Fiber-Optic Zonal Inversion Bundle/Reducer

Figure 8:
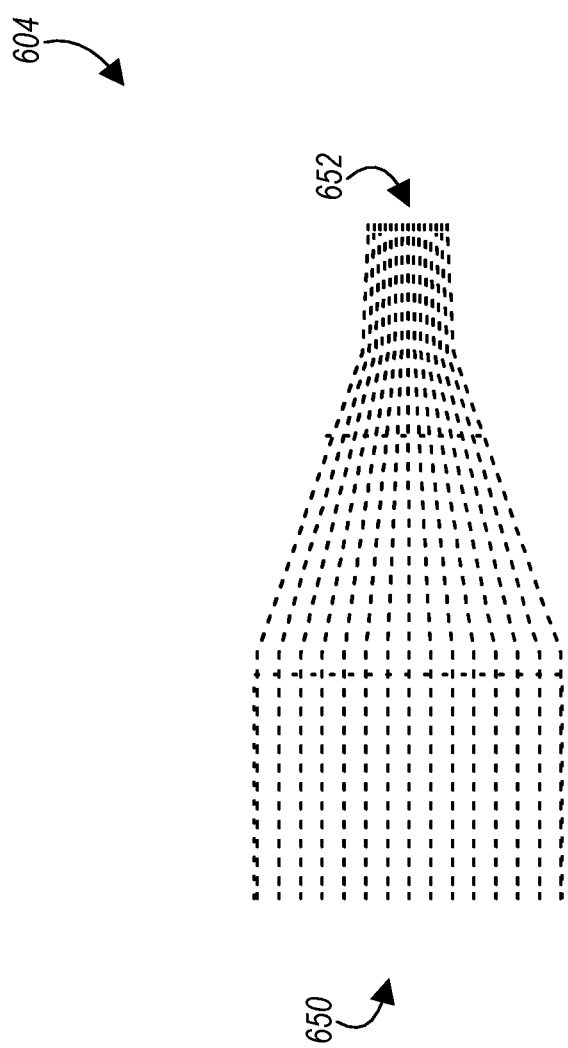
FIG. 8 illustrates a fiber-optic inversion bundle/reducer.

Referring now to FIG. 8, some embodiments may implement a combination fiber-optic zonal inversion bundle/reducer. For example, this may be done to achieve a shorter focal length or other desired system magnification when combined with the eyepieces of the zonal eyepiece array to maintain 1× operation for the user.

As illustrated in FIG. 8, the input side 650 of the fiber-optic zonal inversion bundle 604 is sized appropriately to interface with certain components such as the output of an image intensifier. The fiber-optic zonal inversion bundle 604 is then tapered to form an output 652 that is configured to interface with other optical components such as the zonal eyepiece array. Thus, FIG. 8 illustrates a unique and novel optical device that includes both sub-bundles implemented in a fiber-optic zonal inversion bundle as well as a fiber-optic reducer fabricated using the same fiber-optics fibers.

Such a device may be manufactured in any of a number of different ways. For example, in some embodiments, individual sub-bundles may be tapered and twisted in the same operation, such as by heating the center of a fiber-optic bundle, and then twisting to cause inversion and stretching the fiber-optic bundle to cause the taper. This operation may be performed by twisting first, or alternatively tapering first, or alternatively performing a twist and taper movement substantially simultaneously. Once each of the individual bundles have been twisted and tapered, the bundles can be combined into the fiber-optic zonal inversion bundle 604 as described above for the fiber-optic zonal inversion bundle 104.

In an alternative embodiment, embodiments may perform a twist operation on each of the sub-bundles first. The sub-bundles may be combined into an overall bundle. Then, the overall bundle may be tapered.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device comprising:
   a zonal objective array comprising an array of at least three objectives;
   a zonal fiber-optic inversion bundle, comprising a plurality of at least three sub-bundles, each sub-bundle having an input coupled to a corresponding objective in the zonal objective array;
   a zonal eyepiece array comprising an array of at least three eyepieces, each of the eyepieces in the zonal eyepiece array being coupled to an output of a corresponding sub-bundle in the zonal fiber-optic inversion bundle, and further being configured to output light from each of the eyepieces in the array of at least three eyepieces to a single eye of a user;
   wherein an arrangement of the array of at least three objectives, plurality of at least three sub-bundles, and array of at least three eyepieces is optically direct view;
   a second zonal objective array comprising a second array of at least three objectives;
   a second zonal fiber-optic inversion bundle, comprising a second plurality of at least three sub-bundles, each sub-bundle having an input coupled to a corresponding objective in the second zonal objective array; and
   a second zonal eyepiece array comprising a second array of at least three eyepieces, each of the eyepieces in the second zonal eyepiece array being coupled to an output of a corresponding sub-bundle in the second zonal fiber-optic inversion bundle, and further being configured to output light from each of the eyepieces in the second array of at least three eyepieces to a second single eye of the user.

2. The optical device of claim 1, wherein the zonal objective array comprises a planar lens array having the array of objectives.

3. The optical device of claim 1, wherein the zonal eyepiece array comprises a planar lens array having the array of eyepieces.

4. The optical device of claim 1, wherein the zonal objective array or the zonal eyepiece array comprises discrete conventional optic lenses.

5. The optical device of claim 1, wherein the zonal objective array comprises an array of catadioptric elements.

6. The optical device of claim 1, wherein the zonal fiber-optic inversion bundle is also configured as a tapered fiberoptic, having a first side with a first diameter and a second side with a second diameter, wherein the first side is a larger diameter than the second side, to affect magnification of the overall system.

7. The optical device of claim 6, wherein the tapered fiberoptic is formed by tapering and twisting, to cause inversion functionality, individual sub-bundles in the plurality of at least three sub-bundles, and then combining the individual sub-bundles into the zonal fiber-optic inversion bundle.

8. The optical device of claim 6 wherein the tapered fiberoptic is formed by twisting, to cause inversion functionality, individual sub-bundles in the plurality of at least three sub-bundles, combining the individual sub-bundles into the zonal fiber-optic inversion bundle, and then tapering the zonal fiber-optic inversion bundle.

9. The optical device of claim 8, wherein the intensifier tube comprises a thin intensifier tube comprising a multi-layer ceramic body.

10. The optical device of claim 1, further comprising an intensifier tube coupled to the zonal objective array for receiving light input from the zonal objective array and outputting light to the zonal fiber-optic inversion bundle.

11. The optical device of claim 1, further comprising a plurality of intensifier tubes coupled to the zonal objective array for receiving light input from the zonal objective array and outputting light to the zonal fiber-optic inversion bundle.

12. The optical device of claim 1, wherein the sub-bundles of the zonal fiber-optic inversion bundle comprise outputs that are between 2 to 8 mm wide.

13. The optical device of claim 1, wherein the sub-bundles of the zonal fiber-optic inversion bundle comprise outputs that are between 4 to 6 mm wide.

14. A method of creating an optical device, the method comprising:
obtaining a zonal objective array comprising an array of at least three objectives;
optically coupling the zonal objective array to a zonal fiber-optic inversion bundle, comprising a plurality of at least three sub-bundles, each sub-bundle having an input coupled to a corresponding objective in the zonal objective array;
optically coupling a zonal eyepiece array comprising an array of at least three eyepieces, each of the eyepieces in the zonal eyepiece array being coupled to an output of a corresponding sub-bundle in the zonal fiber-optic inversion bundle;
configuring the array of at least three eyepieces to output light from each of the eyepieces in the array of at least three eyepieces to a single eye of a user;
wherein the array of at least three objectives, plurality of at least three sub-bundles, and array of at least three eyepieces are formed in an arrangement that is optically direct view
obtaining a second zonal objective array comprising a second array of at least three objectives;
optically coupling the second zonal objective array to a second zonal fiber-optic inversion bundle, comprising a second plurality of at least three sub-bundles, each sub-bundle having an input coupled to a corresponding objective in the second zonal objective array;
optically coupling a second zonal eyepiece array comprising a second array of at least three eyepieces, each of the eyepieces in the second zonal eyepiece array being coupled to an output of a corresponding sub-bundle in the second zonal fiber-optic inversion bundle; and
configuring the second array of at least three eyepieces to output light from each of the eyepieces in the second array of at least three eyepieces to a second single eye of the user.

15. The method of claim 14, further comprising configuring the zonal fiber-optic inversion bundle as a reducer.

16. The method of claim 15, wherein configuring the zonal fiber-optic inversion bundle as a reducer comprises tapering and twisting, to cause inversion functionality, individual sub-bundles and then combining the individual sub-bundles into the zonal fiber-optic inversion bundle.

17. The method of claim 15, wherein configuring the zonal fiber-optic inversion bundle as a reducer comprises twisting, to cause inversion functionality, individual sub-bundles, combining the individual sub-bundles into the zonal fiber-optic inversion bundle, and then tapering the bundle.

18. The method of claim 14, further comprising coupling an intensifier tube to the zonal objective array for receiving light input from the zonal objective array and outputting light to the zonal fiber-optic inversion bundle.

19. The method of claim 14, further comprising coupling a plurality of intensifier tubes to the zonal objective array for receiving light input from the zonal objective array and outputting light to the zonal fiber-optic inversion bundle.

20. A method of processing light, the method comprising:
receiving light at a zonal objective array comprising an array of at least three objectives;
coupling light from the zonal objective array into a zonal fiber-optic inversion bundle, comprising a plurality of at least three sub-bundles, each sub-bundle having an input coupled to a corresponding objective in the zonal objective array;
outputting light from the zonal fiber-optic inversion bundle into a zonal eyepiece array comprising an array of at least three eyepieces, each of the eyepieces in the zonal eyepiece array being coupled to an output of a corresponding sub-bundle in the zonal fiber-optic inversion bundle;
outputting light from each of the eyepieces in the array of at least three eyepieces to a single eye of a user;
wherein an arrangement of the array of at least three objectives, plurality of at least three sub-bundles, and array of at least three eyepieces is optically direct view;
receiving light at a second zonal objective array comprising second array of at least three objectives;
coupling light from the second zonal objective array into a second zonal fiber-optic inversion bundle, comprising a second plurality of at least three sub-bundles, each sub-bundle having an input coupled to a corresponding objective in the second zonal objective array;
outputting light from the second zonal fiber-optic inversion bundle into a second zonal eyepiece array comprising a second array of at least three eyepieces, each of the eyepieces in the second zonal eyepiece array being coupled to an output of a corresponding sub-bundle in the second zonal fiber-optic inversion bundle;
outputting light from each of the eyepieces in the second array of at least three eyepieces to a second single eye of the user.

* * * * *